United States Patent
Stephen et al.

(10) Patent No.: US 6,864,689 B2
(45) Date of Patent: Mar. 8, 2005

(54) DETERMINING CABLE ATTENUATION AND LOSS OF SIGNAL THRESHOLD

(75) Inventors: Alexander Stephen, West Lothian (GB); Daya Rasaratnam, West Lothian (GB); Colin Johnstone, Fife (GB)

(73) Assignee: Agilent Technologies, Inc., Palo Alto, CA (US)

( * ) Notice: Subject to any disclaimer, the term of this patent is extended or adjusted under 35 U.S.C. 154(b) by 178 days.

(21) Appl. No.: 10/339,156

(22) Filed: Jan. 9, 2003

(65) Prior Publication Data

US 2003/0137311 A1 Jul. 24, 2003

(30) Foreign Application Priority Data

Jan. 18, 2002 (EP) .............................................. 02250347

(51) Int. Cl.⁷ .............................................. G01R 27/28
(52) U.S. Cl. ...................................... 324/616; 324/543
(58) Field of Search ................................. 324/543, 616

(56) References Cited

U.S. PATENT DOCUMENTS

| 4,090,132 A | 5/1978 | Alexander | 324/158 D |
| 5,530,367 A | * 6/1996 | Bottman | 324/616 |
| 6,466,626 B1 | * 10/2002 | Cecchi et al. | 375/257 |
| 6,489,803 B1 | * 12/2002 | Steiner et al. | 326/31 |

FOREIGN PATENT DOCUMENTS

EP 0721100 A2 7/1996

* cited by examiner

*Primary Examiner*—N. Le
*Assistant Examiner*—Timothy J. Dole

(57) ABSTRACT

Attenuation of a pulsed signal traversing a cable is assessed by identifying a pulse in a signal received after traversing the cable and determining first and second reference signal levels in dependence upon characteristics of the pulse. A measurement is made of the slope of the pulse between the first and second reference signal levels (such as 25% and 75% of the peak pulse magnitude), and this measurement is used to determine an indication of the cable attenuation. The cable attenuation may in turn be used to determine a threshold for indicating loss of signal during a measurement operation.

8 Claims, 4 Drawing Sheets

US 6,864,689 B2

DETERMINING CABLE ATTENUATION AND LOSS OF SIGNAL THRESHOLD

TECHNICAL FIELD

This invention relates to methods and apparatus for determining cable attenuation and loss of signal threshold, in the case for example of measurements of signals propagating over twisted pair cable.

BACKGROUND ART

The telecommunications Plesiochronous Digital Hierarchy (PDH) is widely used to transmit digital information (e.g. digitised telephone calls) along telephone cables at any of a number of standardised data rates. For rates of 44.768 MHz and below a ternary (three-level) signal waveform is used. In this waveform a logic 1 symbol is indicated by the presence of a pulse (relative to a predefined timebase) and a logic 0 symbol is indicated by the absence of a pulse. In general successive logic 1 symbols are represented by respective pulses of opposite polarity to one another. Thus a data signal is made up of positive and negative pulses indicating logic 1 symbols and gaps indicating logic 0 symbols.

PDH transmitter circuits conforming to standards issued by the European Telecommunications Standards Institute (ETSI) generate relatively rectangular positive and negative pulses. However, if the received signal has propagated through a long length of coaxial or twisted pair cable, it will be distorted by the frequency-dependent loss characteristic of the cable. This loss characteristic in the case of twisted pair cable is typically represented by the expression $$\text{Loss} = (P \times \sqrt{f} + Q \times f) \times l$$

where P and Q are constants dependent upon properties of the cable such as size, twists per unit length and conductor thickness, f is the signal frequency and l is the cable length.

Purely resistive attenuation, or flat loss, reduces the amplitude of the received signal without affecting the pulse shape. Cable attenuation however not only reduces the amplitude of the signal but also affects the shape of the received pulses. In general therefore the amplitude of the received signal is a function of the amplitude of the transmitted signal, the flat loss and the cable attenuation.

Signals transmitted at the ETSI E1 rate of 2.048 Mbits/second are frequently carried over twisted pair cable, so the pulse shape at the receiving end of the cable can be severely attenuated and distorted owing to this frequency dependent loss. Circuits which receive E1 signals are therefore designed to restore the amplitude and pulse-shape before attempting to identify logic 1 pulses in the signal. This restoration process is known as equalisation and the amount of equalisation required to restore a signal depends upon the length of cable transited by the signal. PDH receiver circuits known as line interface units (LIUs) are commercially available in integrated circuit form to perform equalisation together with clock recovery and data restoration.

Instruments designed to test the operation of PDH equipment by examining the signals they generate and receive must be able to differentiate between bit errors caused by the equipment under test and errors due to the received signal amplitude being too small. In the latter case, the test equipment should report a LOSS OF SIGNAL (LOS) condition (rather than a fault in the unit under test), ideally at a signal level just above that at which the attenuation of the signal would start to cause errors. In practice LOS is reported by a test instrument when the amplitude of the monitored signal falls below a predetermined threshold. This LOS threshold is usually determined during manufacturing calibration of an instrument by reducing the amplitude of a signal input to the instrument, as if the signal were affected by flat loss, to an 'onset of errors' level where data errors begin to occur, and then setting the LOS threshold just above this onset of errors level. For example, if errors begin to occur when a signal is attenuated by 10 dB the LOS threshold would be set at the 9 dB attenuation level.

PDH test equipment conveniently uses a receiver LIU to provide equalisation and thus restore pulses distorted by cable attenuation. An LIU is capable of restoring a signal which has been reduced in amplitude by cable attenuation to a level much smaller than that which would result in errors if the attenuation were caused by flat loss. Whereas a signal affected only by flat loss may start to show attenuation-induced errors at a received amplitude 7 dB below nominal, a signal which has travelled along the maximum allowable length of twisted-pair cable and arrives at the receiver LIU with an attenuation of for example 14 dB may well produce no errors in the data error checking circuits after equalisation. The actual LOS level used in a measurement must therefore be recalibrated to take account of the amount of cable attenuation suffered by the incoming signal, so this cable attenuation must in turn be ascertained.

DISCLOSURE OF INVENTION

According to one aspect of this invention there is provided a method of assessing attenuation of a pulsed signal traversing a cable, comprising the steps of:

identifying a pulse in a signal received after traversing a cable;

determining first and second reference signal levels in dependence upon characteristics of the pulse;

measuring the slope of the pulse between the first and second reference signal levels; and determining an indication of cable attenuation from the measured slope.

According to another aspect of this invention there is provided apparatus for assessing attenuation of a pulsed signal traversing a cable, comprising:

means for identifying a pulse in a signal received after traversing a cable;

means for determining first and second reference signal levels in dependence upon characteristics of the pulse;

means for measuring the slope of the pulse between the first and second reference signal levels; and means for determining an indication of cable attenuation from the measured slope.

BRIEF DESCRIPTION OF DRAWINGS

A method and apparatus in accordance with this invention, for use in testing PDH communications equipment, will now be described, by way of example, with reference to the accompanying drawings, in which.

BEST MODE FOR CARRYING OUT THE INVENTION, & INDUSTRIAL APPLICABILTY

Figure 1:
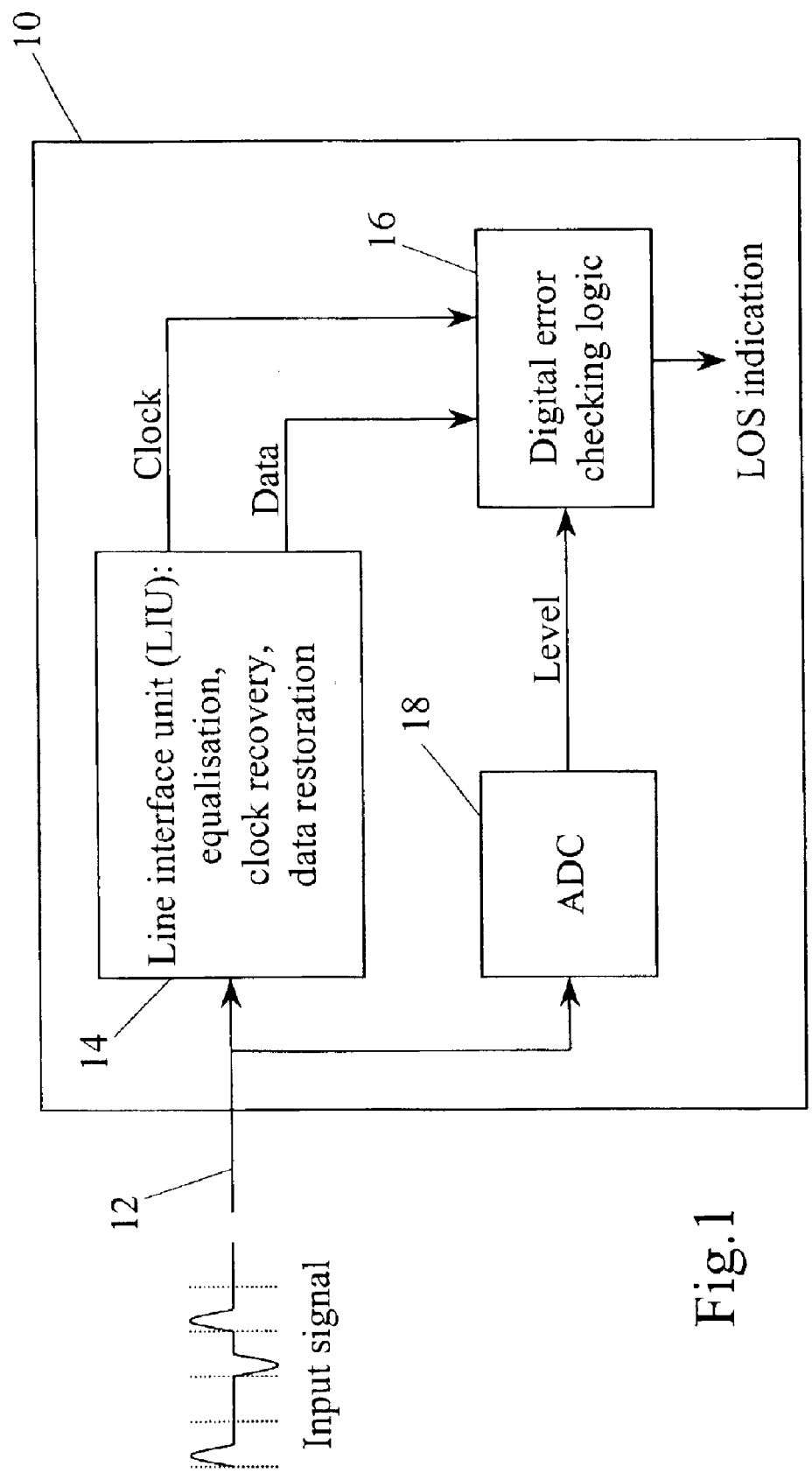
FIG. 1 is a block schematic diagram of a PDH test instrument.

Referring to FIG. 1, a test instrument 10 has an input 12 for receiving a ternary PDH signal from an equipment under test. Within the instrument the signal is applied to an LIU 14 which operates in accordance with known principles to perform equalisation on the signal, and thereby compensate for the effects on the signal of cable attenuation. The LIU 14 restores the shape of the pulses in the received signal, determines the repetition rate of the pulses and generates a corresponding clock signal, and identifies the logical value of the restored signal in synchrony with the clock signal. The resulting clock and data signals are supplied by the LIU 14 to digital error checking logic 16 which provides indications of parameters such as the bit error rate (BER) of the detected data signal. In addition the logic 16 provides an indication of LOS.

A sampling analogue-to-digital converter (ADC) 18 also receives the signal at the input 12 (that is, prior to equalisation and restoration by the LIU 14), for monitoring of the signal level. The ADC 18 measures the amplitudes (positive and negative) of successive samples of the signal (in the present case, at a sample rate of 80 MHz) and outputs a digital value proportional to the size of the signal, but it cannot distinguish the relative contributions of flat loss and cable attenuation that produce the measured amplitudes. The ADC measurements must be made on the input signal before it reaches the LIU 14. If the signal were supplied to the ADC 18 after processing by the LIU 14, the equalisation and data restoration circuitry in the LIU would render the measurements valueless. However, because the ADC 18 is measuring the signal prior to equalisation, its measurements can be used in accordance with this invention to determine the amount of cable attenuation, and thus an appropriate compensation of the LOS threshold.

Because the cable attenuation follows a predominantly $\sqrt{f}$ law, higher frequencies are attenuated more than lower ones. In consequence the longer the cable is, the fewer high frequency components there are in the received signal's spectrum. As the higher frequency components disappear, the pulses become more rounded and the signal takes longer to reach its peak value at the start of each pulse. The inventors hereof have found that there is a correlation between the time taken for a pulse to rise towards its peak value from the zero value (the slope) and the amount of cable attenuation. Resistive attenuation may reduce the pulse size but the slope remains the same. This slope can be determined by measuring the time for the pulse to vary between two selected fractions or percentages of the peak level. This measurement enables an indication of cable attenuation to be ascertained independently of resistive attenuation and transmitted signal level. This indication can be used to adjust the LOS threshold as appropriate for the amount of cable attenuation present.

In the embodiment described below sample measurements of a pulse made by the ADC 18 are stored in random access memory (RAM) and the pulse's peak value is identified during this process. Once the peak level is found the memory is read in reverse time order, and a determination is made of the time interval required for the pulse edge to traverse the amplitude range between the two selected percentages of the peak level. As the measurement is performed digitally and with binary numbers, the two percentages selected are 25% and 75%. These two values can be easily calculated by shifting and adding the binary representations of the captured values: one right shift operation yields a 50% value, and a second right shift operation yields the 25% value; adding these two shifted values provides the 75% value.

Figure 2:
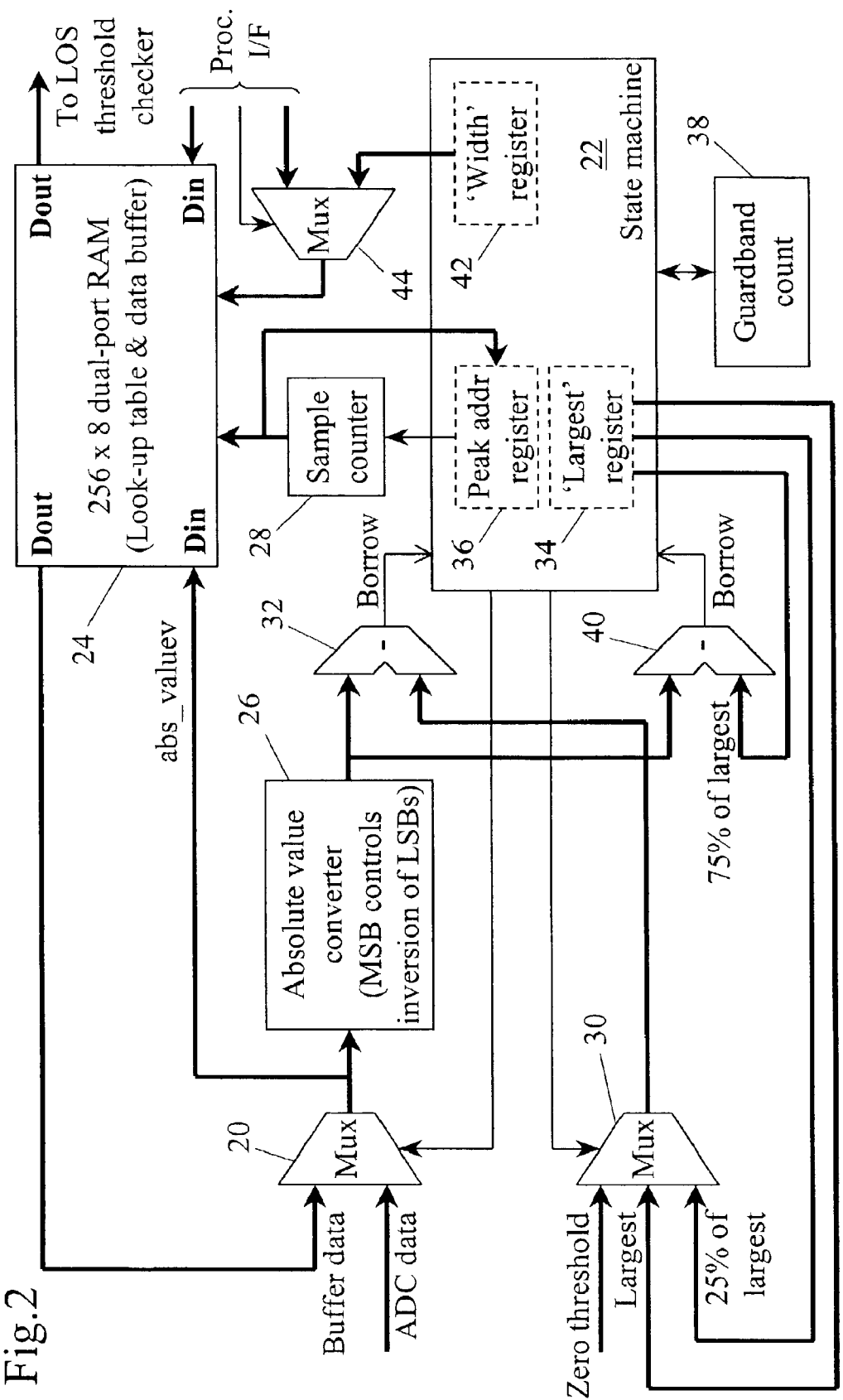
FIG. 2 is a block schematic diagram of circuitry for determining cable attenuation and thus LOS threshold.
Figure 3:
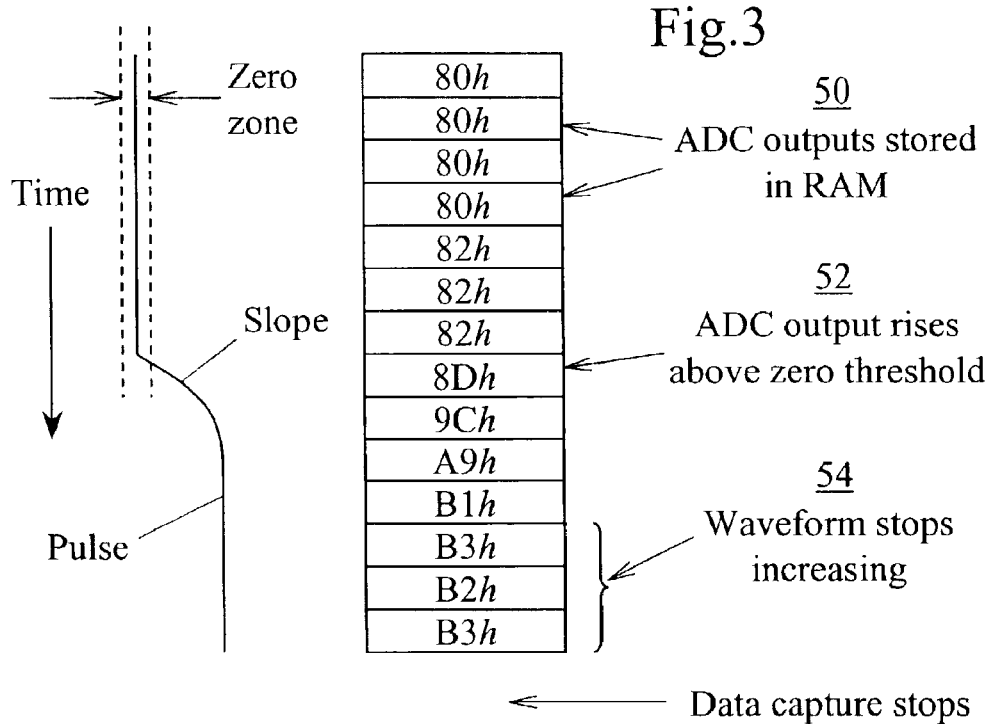
FIG. 3 is a diagram illustrating functional steps in the operation of the circuitry of FIG. 2.
Figure 3:
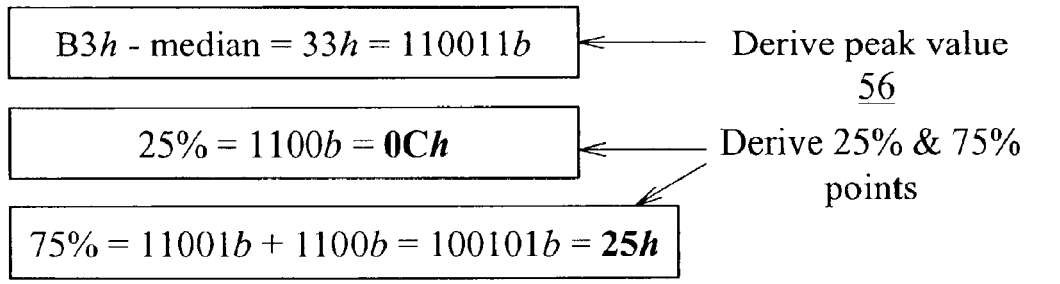
Figure 3:
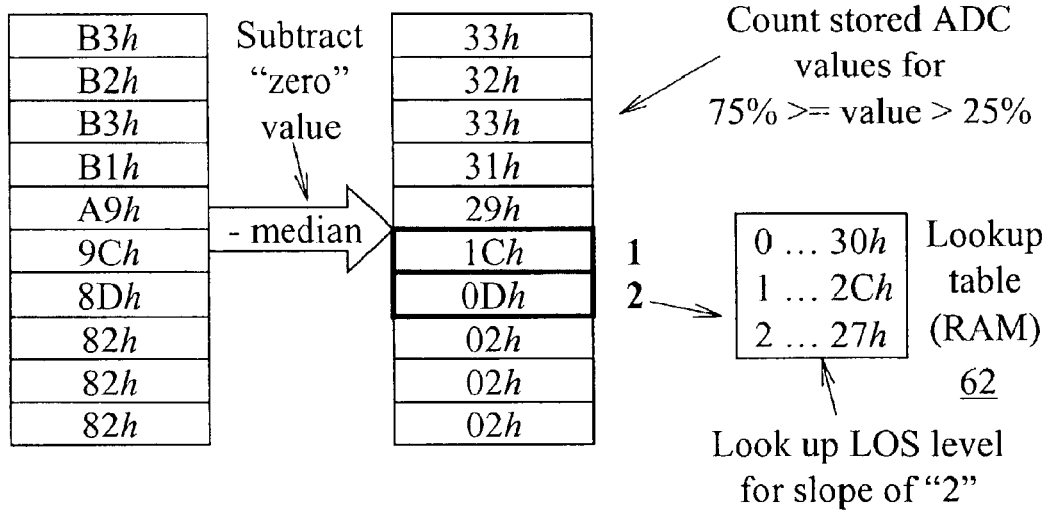
Figure 4:
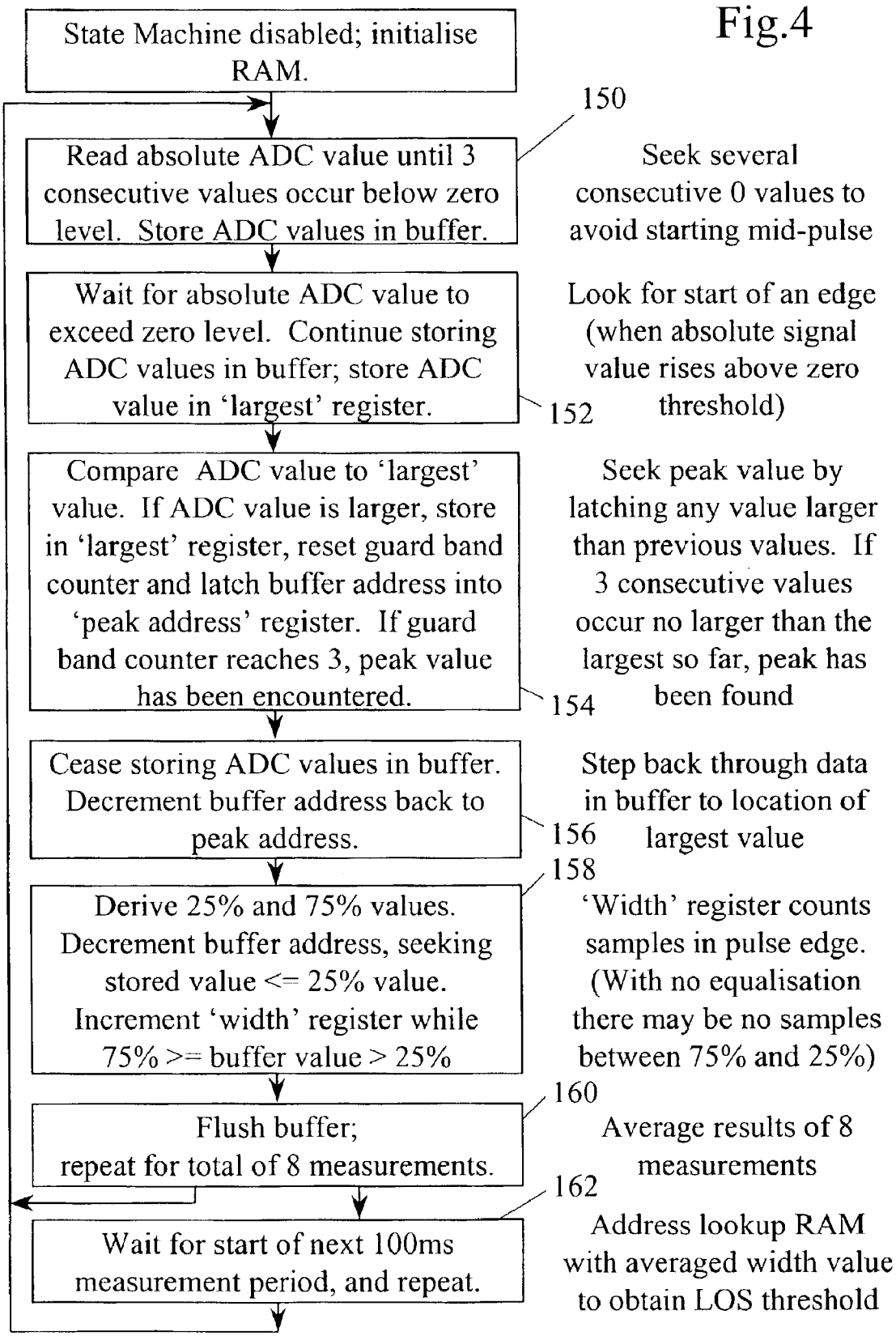
FIG. 4 is a flow chart of these functional steps.

FIG. 2 is a schematic block diagram of one circuit for implementing this invention, the operation of which is illustrated in FIG. 3. Referring to FIG. 2, the incoming digital sample values supplied by the ADC 18 are input to a multiplexer 20 which is controlled by a state machine 22 during a first phase of operation to select the ADC output and pass it to one input of a two-port RAM 24 and to an absolute value converter 26. The RAM 24 is used as a circular buffer memory to store each digitised sample at an address determined by a counter 28 which counts the received samples (as indicated at 50 in FIG. 3 and 150 in FIG. 4).

The absolute value converter 26 derives the absolute value of its input signal. In the case of 2's complement binary numbers this is accomplished by controlling inversion of all bits but the most significant bit of each number in accordance with the value of the most significant bit (1=invert).

A second multiplexer 30 is controlled by the state machine 22 to select one of three inputs: during the first phase of operation of the circuit the input selected is one receiving a predetermined zero threshold. This zero threshold is chosen to be less than the normal LOS threshold, but greater than any expected ripple which may affect the zero level of the received ternary signal.

The output of the multiplexer 30 is supplied to a comparator (subtractor) 32 which also receives the absolute sample values from the converter 26, and which monitors the sample values to detect a point where the sampled signal rises above the predetermined zero threshold, indicating that a pulse is starting. After this occurs (see 52 in FIG. 3 and 152 in FIG. 4), the current absolute sample value is stored in a 'largest' register 34 in the state machine 22, the content of this register is selected by the multiplexer 30 for supply to the comparator 32, the address in the RAM 24 at which this sample is being stored is latched into a peak address register 36 in the state machine 22, and a guardband counter 38 is reset to zero.

The comparator 32 continues to check further received sample values to determine if each is larger than the previous largest sample stored in the register 34. Each larger sample that does occur is stored in the register 34, its RAM address is latched into the register 36 and the guardband counter 38 is reset. When three consecutive samples are received (as counted by the guardband counter) none of which is larger than the current largest sample, the top of the pulse is considered to have been detected (see 54 in FIG. 3 and 154 in FIG. 4).

At this point the 'largest' register 34 contains the largest (i.e. peak) ADC value of the input signal pulse. The state machine 22 terminates data capture and derives the value of this peak relative to the signal's actual zero level, and causes the 'largest' register 34 to generate corresponding values for 75% and 25% of the peak value, as described above. The signal zero level used for this purpose may be determined from the median level of the ternary signal, for example using the technique described in European patent application no. 01 3 09 711.8. The sample counter 28 is stepped backwards until it equals the address in the RAM 24 of the detected peak value (56 in FIG. 3/156 in FIG. 4). The multiplexer 20 is now controlled by the state machine 22 to supply the absolute value converter 26 with stored sample values read out from locations in the RAM 24 as specified by the sample counter 28.

The 75%-of-largest value from the register 34 is supplied by the state machine 22 to a comparator 40 which also receives the output from the absolute value converter 26. Meanwhile the 25%-of-largest value is selected by the multiplexer 30 for supply to the comparator 32. The stored samples are read from the RAM 22 in reverse order, by decrementing the sample counter 28. When the comparator 40 indicates that the stored sample value is equal to or less than the 75% level, a count of samples read out is started in a 'width' register 42 in the state machine 22. This count is continued until the comparator 32 indicates that the value of the stored samples has reached the 25% level. Thus the 'width' register 42 acquires a count of the number of samples of the measured pulse having values between the 75% and 25% trigger levels (see 58 in FIG. 3 and 158 in FIG. 4).

To reduce the potential variation in measurements of signal values very close to the thresholds, the measurement process described above is repeated 8 times. The resulting values in the 'width' register are aggregated (by adding the width count for each successive measurement into the cumulative total in the register). After 8 measurements the aggregate is divided by 8 (by right-shifting the stored binary number by three bits) to derive a mean value indicative of the slope of the measured pulse, and thus related to the cable attenuation present. (See 160 in FIG. 4.)

Finally a multiplexer 44 is operated (by a master processor not shown, located for example in the digital error checking logic 16 of FIG. 1) to apply the mean value in the 'width' register 42 to a second address input of the RAM 24, to access a portion of the RAM loaded with a look-up table of LOS threshold values corresponding to different amounts of cable attenuation. The LOS value for the measured cable attenuation is supplied by the RAM 24 to the instrument's circuitry for detecting and reporting a LOSS OF SIGNAL condition (see 62 in FIG. 3 and 162 in FIG. 4). The LOS threshold values stored in the RAM 24 can be determined by empirical measurements of test assemblies containing differing lengths of cable and thus imposing differing levels of cable attenuation.

The embodiment of the invention described above with reference to FIGS. 2 to 4 has the advantage that it can readily be implemented in fast hardware (e.g. using field programmable gate array technology). However, it should be understood that other implementations are possible, using for example discrete dedicated-function hardware components or general-purpose processors controlled by stored software program instructions. Other changes can be made to the embodiment described above. For example, the slope of the pulses can be estimated by counting ADC samples occurring between thresholds at 10% and 50% of the peak value instead of at 25% and 75% of that value.

What is claimed is:

1. A method of assessing attenuation of a pulsed signal traversing a cable, comprising:

identifying a pulse in a signal received after traversing a cable;

determining first and second reference signal levels in dependence upon characteristics of the pulse;

measuring the slope of the pulse between the first and second reference signal levels;

determining an indication of cable attenuation from the measured slope;

measuring the magnitude of multiple samples of the signal;

identifying samples which occurred during a pulse in the signal;

counting the number of samples which occurred as the pulse varied between the first and second signal levels; and determining the indication of cable attenuation as a function of the number of samples counted.

2. The method of claim 1, wherein said successive samples of the signal are stored in successive locations in a memory, and the first and second reference signal levels are determined by scanning the memory locations in a reverse order to the order in which the samples were stored therein.

3. The method of claim 1, including the step of determining a loss of signal threshold as a function of the cable attenuation.

4. A method of assessing attenuation of a pulsed signal traversing a cable, comprising:

identifying a pulse in a signal received after traversing a cable;

determining first and second reference signal levels in dependence upon characteristics of the pulse;

measuring the slope of the pulse between the first and second reference signal levels; and determining an indication of cable attenuation from the measured slope, wherein the first and second reference levels are 25% and 75% of the peak magnitude of the pulse.

5. An apparatus for assessing attenuation of a pulsed signal traversing a cable, comprising:

means for identifying a pulse in a signal received after traversing a cable;

means for determining first and second reference signal levels in dependence upon characteristics of the pulse;

means for measuring the slope of the pulse between the first and second reference signal levels; and means for determining an indication of cable attenuation from the measured slope;

means for measuring the magnitude of multiple samples of the signal;

means for identifying samples which occurred during a pulse in the signal;

means for counting the number of samples which occurred as the pulse varied between the first and second signal levels; and means for determining the indication of cable attenuation as a function of the number of samples counted.

6. The apparatus of claim 5, including a memory for storing said successive samples of the signal in successive locations of the memory, and wherein the means for determining first and second reference signal levels scans the memory locations in a reverse order to the order in which the samples were stored therein.

7. The apparatus of claim 5, wherein the first and second reference levels are 25% and 75% of the peak magnitude of the pulse.

8. The apparatus of claim 5, including means for determining a loss of signal threshold as a function of the cable attenuation.

* * * * *